(12) United States Patent
Li et al.

(10) Patent No.: US 11,010,020 B2
(45) Date of Patent: May 18, 2021

(54) METHOD, APPARATUS AND STORAGE MEDIUM FOR DISPLAYING SHORTCUT OPERATION PANEL

(71) Applicant: BEIJING XIAOMI MOBILE SOFTWARE CO., LTD., Beijing (CN)

(72) Inventors: Jiayi Li, Beijing (CN); Zhaoqin Lin, Beijing (CN); Ming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/587,498

(22) Filed: Sep. 30, 2019

(65) Prior Publication Data
US 2020/0192529 A1 Jun. 18, 2020

(30) Foreign Application Priority Data
Dec. 17, 2018 (CN) .......................... 201811544061.9

(51) Int. Cl.
| | | |
|---|---|---|
| *G06F 3/048* | (2013.01) | |
| *G06F 3/0482* | (2013.01) | |
| *G06F 3/041* | (2006.01) | |
| *G06F 3/0481* | (2013.01) | |
| *G06F 3/0486* | (2013.01) | |

(52) U.S. Cl.
CPC ............ *G06F 3/0482* (2013.01); *G06F 3/041* (2013.01); *G06F 3/0486* (2013.01); *G06F 3/04817* (2013.01); *G06F 2203/04102* (2013.01)

(58) Field of Classification Search
CPC .... G06F 3/0482; G06F 3/041; G06F 3/04817; G06F 3/0486

USPC .......................................................... 715/811
See application file for complete search history.

(56) References Cited

U.S. PATENT DOCUMENTS

| | | | | |
|---|---|---|---|---|
| 9,417,754 B2* | 8/2016 | Smith | ................ | G06F 1/1647 |
| 10,067,645 B2* | 9/2018 | King | ................ | G06F 3/0488 |
| 10,152,201 B2* | 12/2018 | Kang | ................ | G06F 3/0487 |
| 10,230,826 B1* | 3/2019 | Liu | ................ | G06F 1/1641 |
| 10,379,573 B2* | 8/2019 | Park | ................ | G06F 1/1616 |

(Continued)

FOREIGN PATENT DOCUMENTS

| | | |
|---|---|---|
| CN | 103593009 A | 2/2014 |
| CN | 103593009 A | 2/2014 |

(Continued)

OTHER PUBLICATIONS

European Extended Search Report issued in EP19200508.0, dated Mar. 19, 2020, 7 pages.

(Continued)

*Primary Examiner* — David Phantana-angkool
(74) *Attorney, Agent, or Firm* — Arch & Lake LLP

(57) ABSTRACT

The present disclosure relates to a method, apparatus, and storage medium for displaying a shortcut operation panel, and belongs to the field of terminal technologies. The method includes: displaying, by a terminal having a folding display screen, a user interface of a target application in a home screen, wherein the home screen is part of a folding display screen; and when an auxiliary screen is in an expanded state, displaying a shortcut operation panel on the auxiliary screen. The auxiliary screen is part of the folding display screen. The shortcut operation panel comprises an icon of at least one shortcut operation function related to the target application.

16 Claims, 12 Drawing Sheets

(56) References Cited

U.S. PATENT DOCUMENTS

| | | | |
|---|---|---|---|
| 10,379,720 B2* | 8/2019 | Ryu | G09G 5/373 |
| 10,394,371 B2* | 8/2019 | Kim | G06F 1/1643 |
| 10,528,078 B2* | 1/2020 | Park | G06F 1/1616 |
| 10,782,878 B2* | 9/2020 | Gao | G06F 1/1681 |
| 10,839,773 B2* | 11/2020 | Nemoto | G06F 3/0346 |
| 10,840,464 B2* | 11/2020 | Hiroki | H01L 51/0097 |
| 10,857,461 B2* | 12/2020 | Nakamura | A63F 13/428 |
| 10,915,143 B2* | 2/2021 | Sepulveda | G06F 1/1647 |
| 10,936,166 B2* | 3/2021 | Kang | G06F 9/451 |
| 10,942,570 B2* | 3/2021 | Missig | G06F 3/0488 |
| 2011/0090155 A1* | 4/2011 | Caskey | G06F 1/1641 345/173 |
| 2013/0321340 A1* | 12/2013 | Seo | G06F 1/1652 345/174 |
| 2014/0006990 A1* | 1/2014 | Harada | G06F 1/1616 715/769 |
| 2014/0152576 A1* | 6/2014 | Kim | G06F 3/0304 345/169 |
| 2014/0218321 A1 | 8/2014 | Lee | |
| 2015/0007066 A1* | 1/2015 | Joo | G06F 3/1423 715/761 |
| 2015/0331551 A1* | 11/2015 | Lee | G06F 3/04817 715/781 |
| 2016/0188197 A1* | 6/2016 | Ryu | G06F 3/0482 345/156 |
| 2016/0378270 A1 | 12/2016 | Lee | |
| 2017/0031530 A1* | 2/2017 | Ikeda | H04N 9/3179 |
| 2019/0042066 A1* | 2/2019 | Kim | G06F 1/1649 |
| 2019/0361694 A1* | 11/2019 | Gordon | G06F 1/3231 |
| 2020/0183574 A1* | 6/2020 | Chen | G06F 3/0486 |
| 2020/0192529 A1* | 6/2020 | Li | G06F 3/041 |

FOREIGN PATENT DOCUMENTS

| | | |
|---|---|---|
| CN | 104704494 A | 6/2015 |
| CN | 104704494 A | 6/2015 |
| CN | 105452983 A | 3/2016 |
| CN | 105452983 A | 3/2016 |
| CN | 107704177 A | 2/2018 |
| CN | 107704177 A | 2/2018 |
| CN | 108319436 A | 7/2018 |
| CN | 108319436 A | 7/2018 |
| CN | 109005286 A | 12/2018 |
| CN | 109005286 A | 12/2018 |
| EP | 3483715 A1 | 5/2019 |
| EP | 3483715 A1 | 5/2019 |
| WO | 2016052778 A1 | 4/2016 |
| WO | 2016052778 A1 | 4/2016 |
| WO | 2018034555 A1 | 2/2018 |

OTHER PUBLICATIONS

Chinese Office Action issued in CN201811544061.9, dated Apr. 10, 2020, 7 pages.

The Extended European Search Report issued to EP Application No. 19200508.0 dated Mar. 19, 2020, (7p).

First Office Action issued to Chinese Patent Application No. 201811544061.9 dated Apr. 10, 2020 with English translation, (17p).

* cited by examiner

METHOD, APPARATUS AND STORAGE MEDIUM FOR DISPLAYING SHORTCUT OPERATION PANEL

CROSS-REFERENCE TO RELATED APPLICATION

This application is based upon and claims priority to Chinese Patent Application No. 201811544061.9, filed on Dec. 17, 2018, the entire contents thereof are incorporated herein by reference.

TECHNICAL FIELD

The embodiments of the present disclosure relate to the field of terminal technologies, and in particular, to a method, apparatus, and storage medium for displaying a shortcut operation panel.

BACKGROUND

With the recent development of the terminal, the user's operation on the terminal is more and more convenient.

In the related art, the user may slide down from the top of the screen of a mobile phone, and then a shortcut operation panel appears on the screen. Icons of a plurality of shortcut operations functions are displayed on the shortcut operation panel. For example, the shortcut operation function may be used to enable a wireless connection, enable mobile data, turn on positioning, turn on Bluetooth, set silent mode, turn on the flashlight, etc. By clicking the icon of the shortcut operation function by the user, the corresponding system program or application software can be quickly launched.

SUMMARY

Embodiments of the present disclosure provide a method, apparatus, and storage medium for displaying a shortcut operation panel.

According to a first aspect of the present disclosure, a method for displaying a shortcut operation panel, applied to a terminal having a folding display screen, the folding display screen including a home screen and n auxiliary screen, the home screen and the auxiliary screen being foldable with respect to each other, and n being a positive integer is provided. The method includes: displaying a user interface of a target application on the home screen; and when the auxiliary screen is in an expanded state, displaying the shortcut operation panel on the auxiliary screen, the shortcut operation panel comprising an icon of at least one shortcut operation function related to the target application.

According to a second aspect of the present disclosure, an apparatus for displaying a shortcut operation panel, applied to a terminal having a folding display screen, the folding display screen including a home screen and n auxiliary screen, the home screen and the auxiliary screen being foldable with respect to each other, and n is a positive integer is provided. The apparatus includes: a first display module, configured to display a user interface of a target application on the home screen; and a second display module, configured to, when the auxiliary screen is in an expanded state, display a shortcut operation panel on the auxiliary screen, the shortcut operation panel comprising an icon of at least one shortcut operation function related to the target application.

According to a third aspect of the present disclosure, an apparatus for displaying a shortcut operation panel, applied to a terminal having a folding display screen, the folding display screen including a home screen and n auxiliary screen, the home screen and the auxiliary screen being foldable with respect to each other, and n being a positive integer is provided. The apparatus includes: a processor; and a memory for storing executable instructions of the processor; wherein the processor is configured to: display a user interface of a target application on the home screen; and when the auxiliary screen is in an expanded state, display a shortcut operation panel on the auxiliary screen, the shortcut operation panel including an icon of at least one shortcut operation function related to the target application.

According to a fourth aspect of the present disclosure, a non-transitory computer-readable storage medium having stored therein a computer program, wherein the computer program, when executed by a processor, implements the steps of the method according to the first aspect is provided.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
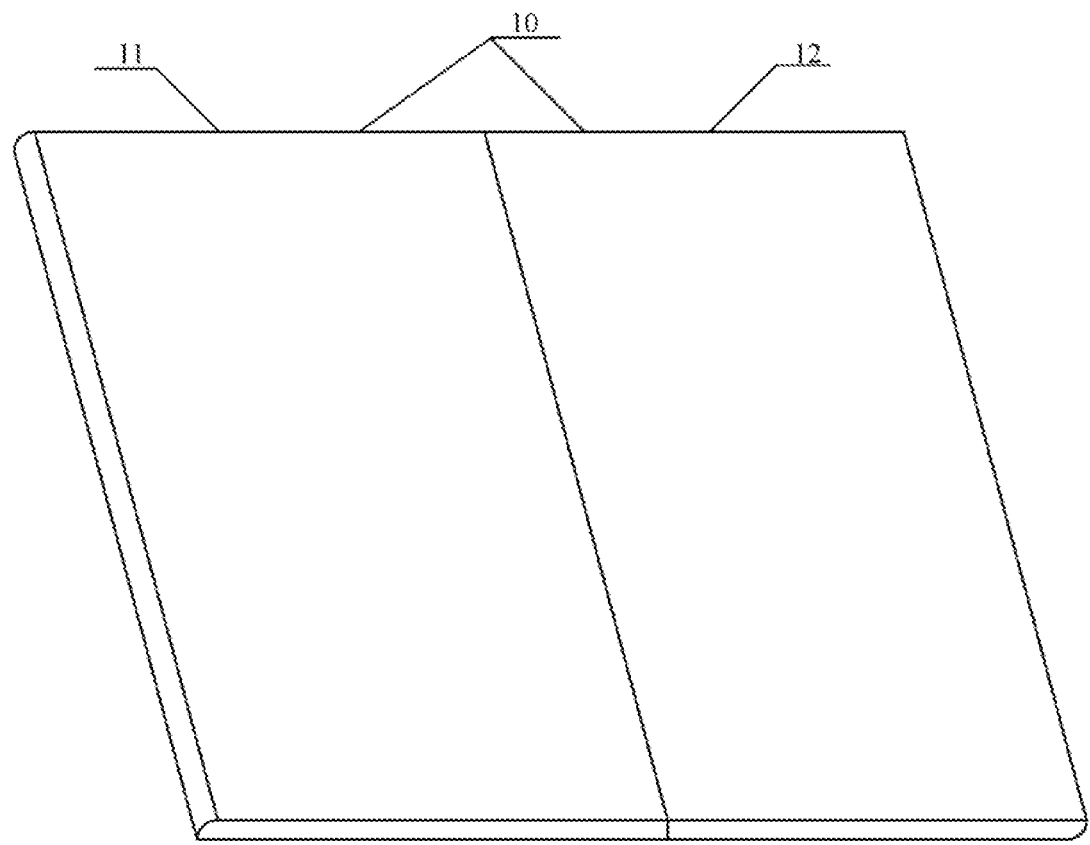
FIG. 1 shows schematic views of a folding display screen according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

In the method provided by the embodiments of the present disclosure, a terminal may be used to execute each step. The above terminal may be an electronic device, such as a mobile phone, a tablet computer, an e-book reader, a multimedia playback device, a wearable device, a portable laptop computer.

The terminal has a folding display screen. The folding display screen is physically foldable. In addition to the display function of the conventional display screen, the folding display screen has a foldable feature. The folding display screen may include both a folded state and an expanded state. When the folding display screen is in the folded state, the space occupied by the terminal can be reduced. This results in a smaller screen for the user to interact with the terminal and a smaller device for the user to carry. When the folding display screen is in the expanded state, a relatively large display screen use area can be provided to the user. This results a realtively larger screen that the user can use to interact with the terminal and a larger device. For example, in the folded state, the screen that user has to interact with the terminal can be half the size compared to if the display screen is in the expanded state.

The folding display screen includes a home screen and at least one auxiliary screen, and the home screen and the auxiliary screen are foldable with respect to each other. The folding display screen may be designed as a display screen foldable along a left-right direction or a display screen foldable along a top-bottom direction, or the folding display screen may be designed as a display screen foldable outward or a display screen foldable inward, or the folding display screen may be designed as a display screen foldable outward and inward, which is not limited by the embodiments of the present disclosure.

In the following, two structural forms of the folding display screen are introduced by using an example in which the folding display screen includes a home screen and one auxiliary screen, and the folding display screen is designed as a display screen foldable along a left-right direction.

In the first structural form, as shown in FIG. 1, the folding display screen 10 includes a home screen 11 and an auxiliary screen 12, and the two screens are connected by a connecting mechanism. The connecting mechanism may be a hinge, a rotating shaft, or other components that can connect the two screens and allow the two screens to be folded with respect to each other, or even a flexible screen, which is not limited by the embodiments of the present disclosure. The attributes, such as the material, the size, and the shape of the two screens, may be the same or different, which is not limited by the embodiments of the present disclosure. For example, both screens may be a rigid screen, or both may be a flexible screen or one screen may be a rigid screen, and the other may be a flexible screen. For another example, one of the two screens is larger, which may be used as the home screen, and the other screen is smaller, which may be used as an auxiliary screen. As another example, one of the two screens is thicker, and the other is thinner than the other.

Figure 2:
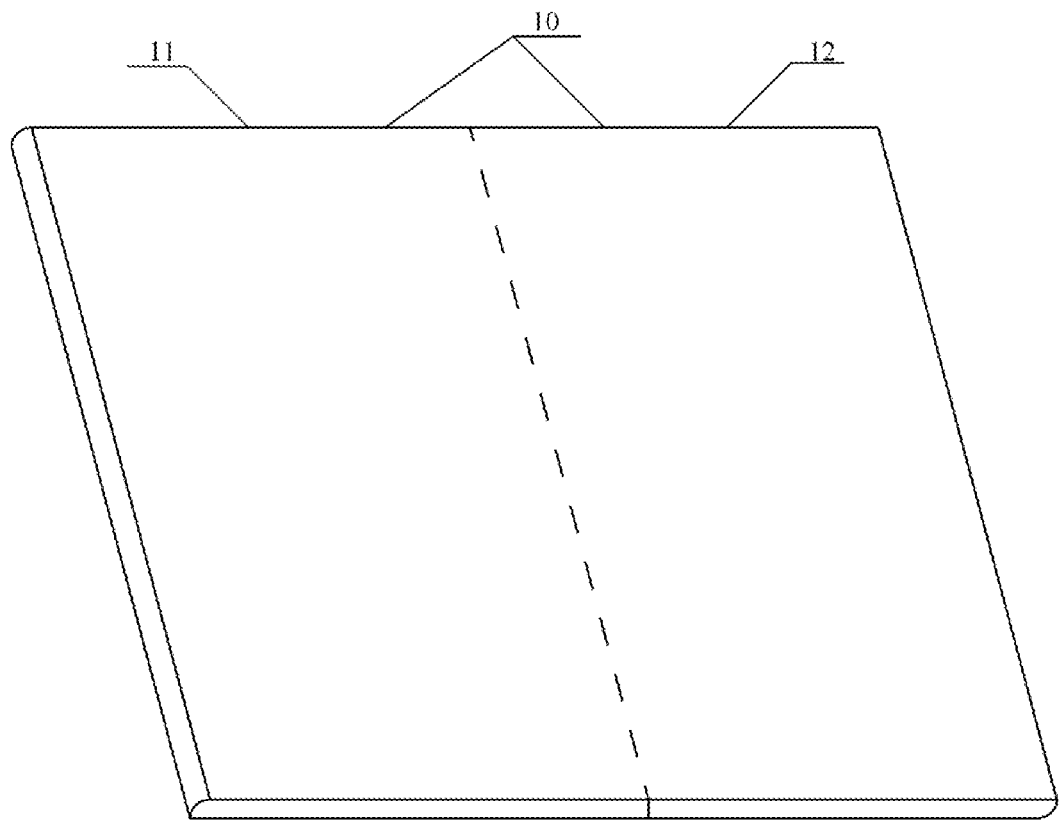
FIG. 2 shows schematic views of a folding display screen according to an exemplary embodiment.

In the second structural form, the folding display screen 10 includes a one-piece screen, which may be a whole piece of a flexible screen or a screen formed by a seamless combination of a flexible screen and a rigid screen through a related manufacturing process. As shown in FIG. 2, when the folding display screen 10 is a one-piece flexible screen, the folding display screen 10 may be divided into a home screen 11 and an auxiliary screen 12, and the sizes of the home screen 11 and the auxiliary screen 12 may be the same or different.

Figure 3:
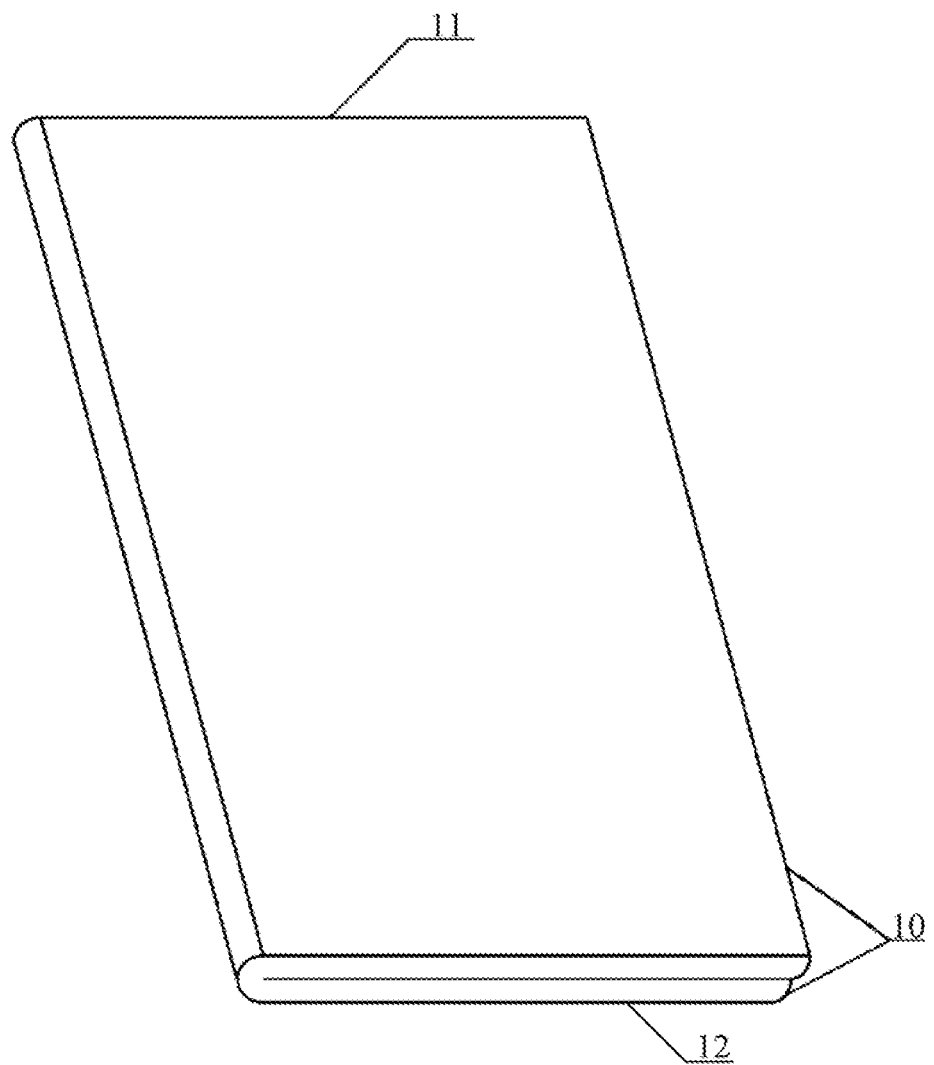
FIG. 3 shows schematic views of a folding display screen according to an exemplary embodiment.

The screen state of the folding display screen refers to a folding condition of the folding display screen. When the folding display screen includes two screens, i.e., a home screen and one auxiliary screen, the screen state of the folding display screen includes a folded state and an expanded state. Illustratively, as shown in FIG. 3, the folded state refers to a state in which the home screen 11 and the auxiliary screen 12 of the folding display screen 10 are parallel, and front sides of the two screens face in opposite directions, the front side of the screen referring to a screen side for displaying the user interface. Illustratively, as shown in FIG. 1, the expanded state refers to a state in which the home screen 11 and the auxiliary screen 12 of the folding display screen are expanded into the same plane, and the front sides of the two screens face the same direction.

In the following, two structural forms of the folding display screen are introduced by using an example in which the folding display screen includes a home screen and two auxiliary screens, that is, the folding display screen includes three screens, and the folding display screen is designed as a display screen foldable in a left-right direction.

Figure 4:
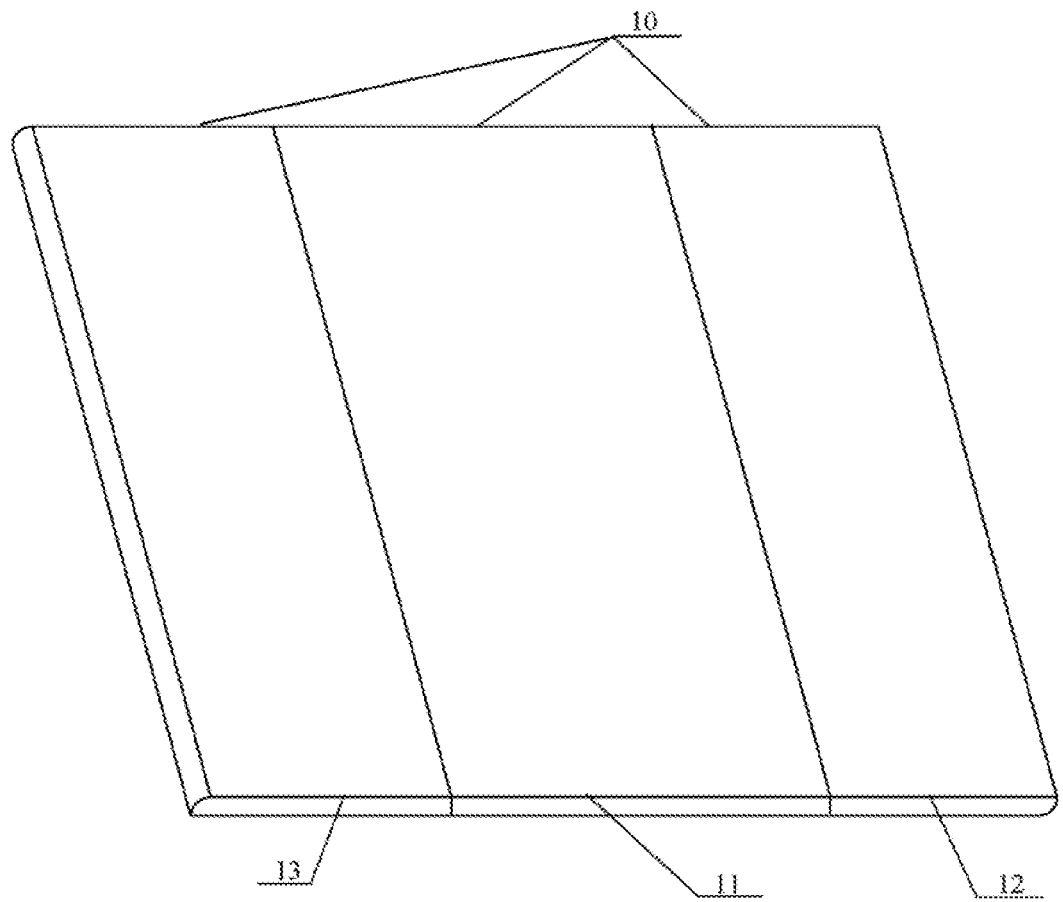
FIG. 4 shows schematic views of a folding display screen according to an exemplary embodiment.

In the first structural form: as shown in FIG. 4, the number of the auxiliary screens of the folding display screen is two, that is, the folding display screen 10 includes a home screen 11, a first auxiliary screen 12 and a second auxiliary screen 13, and the home screen 11 is connected to the first auxiliary screen 12 and the second auxiliary screen 13 respectively by a connection mechanism. In the embodiments of the present disclosure, the explanations are given by using an example in which the first auxiliary screen 12 and the second auxiliary screen 13 are mutually symmetrical. In other embodiments, the first auxiliary screen 12 and the second auxiliary screen 13 may also be asymmetric. The embodiments of the present disclosure are not limited to any one particular condition or condition.

Figure 5:
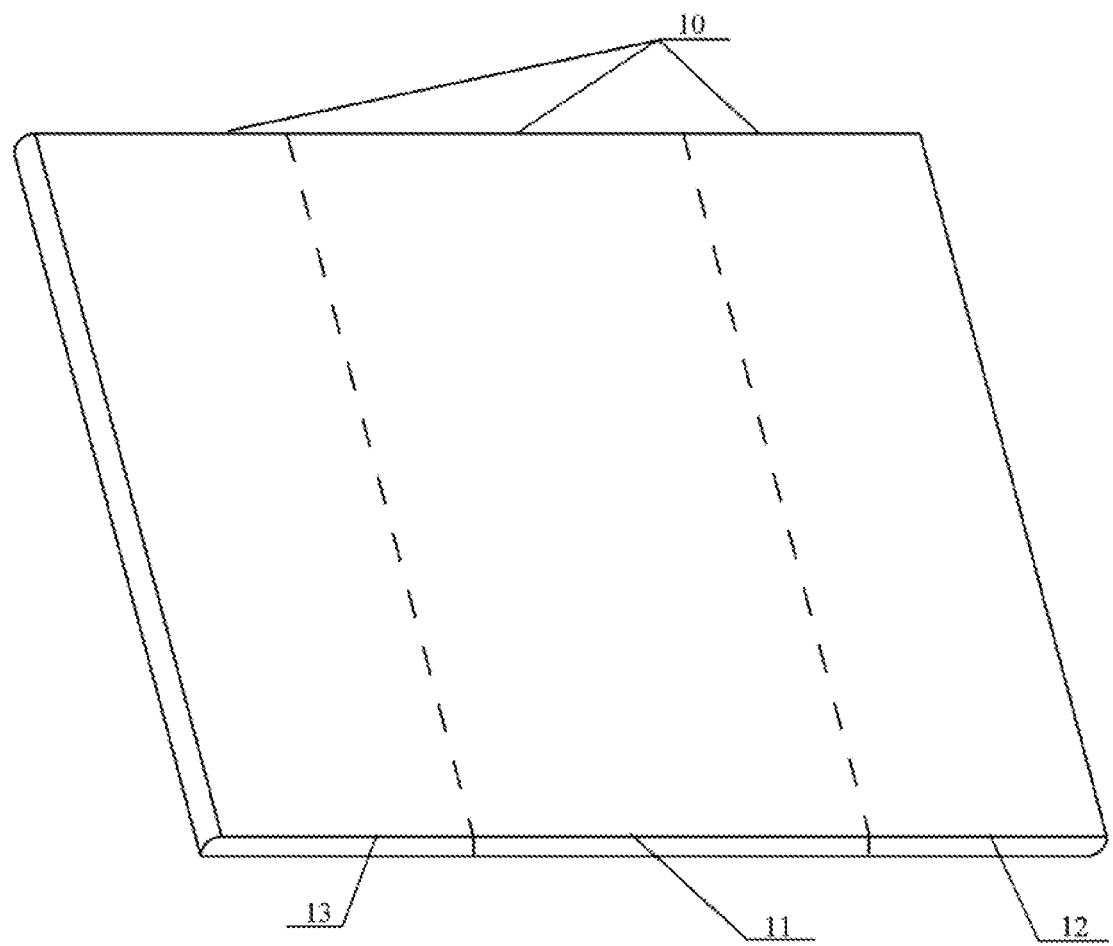
FIG. 5 shows schematic views of a folding display screen according to an exemplary embodiment.

In the second structural form, as shown in FIG. 5, the folding display screen 10 is a whole screen. When the folding display screen 10 is a whole piece of a flexible screen, the folding display screen 10 may be divided into three screens, that is, a home screen 11, a first auxiliary screen 12 and a second auxiliary screen 13. In some other embodiments, the folding display screen 10 may also be divided into more pieces of screens. In some other embodiments, the folding display screen 10 is a seamless combination of a flexible screen and a rigid screen. For example, the home screen 11 is a flexible screen, and at least one of the first auxiliary screen 12 and the second auxiliary screen 13 is a rigid screen. For another example, the home screen 11 is a rigid screen, and the first auxiliary screen 12 and the second auxiliary screen 13 are flexible screens.

Figure 6:
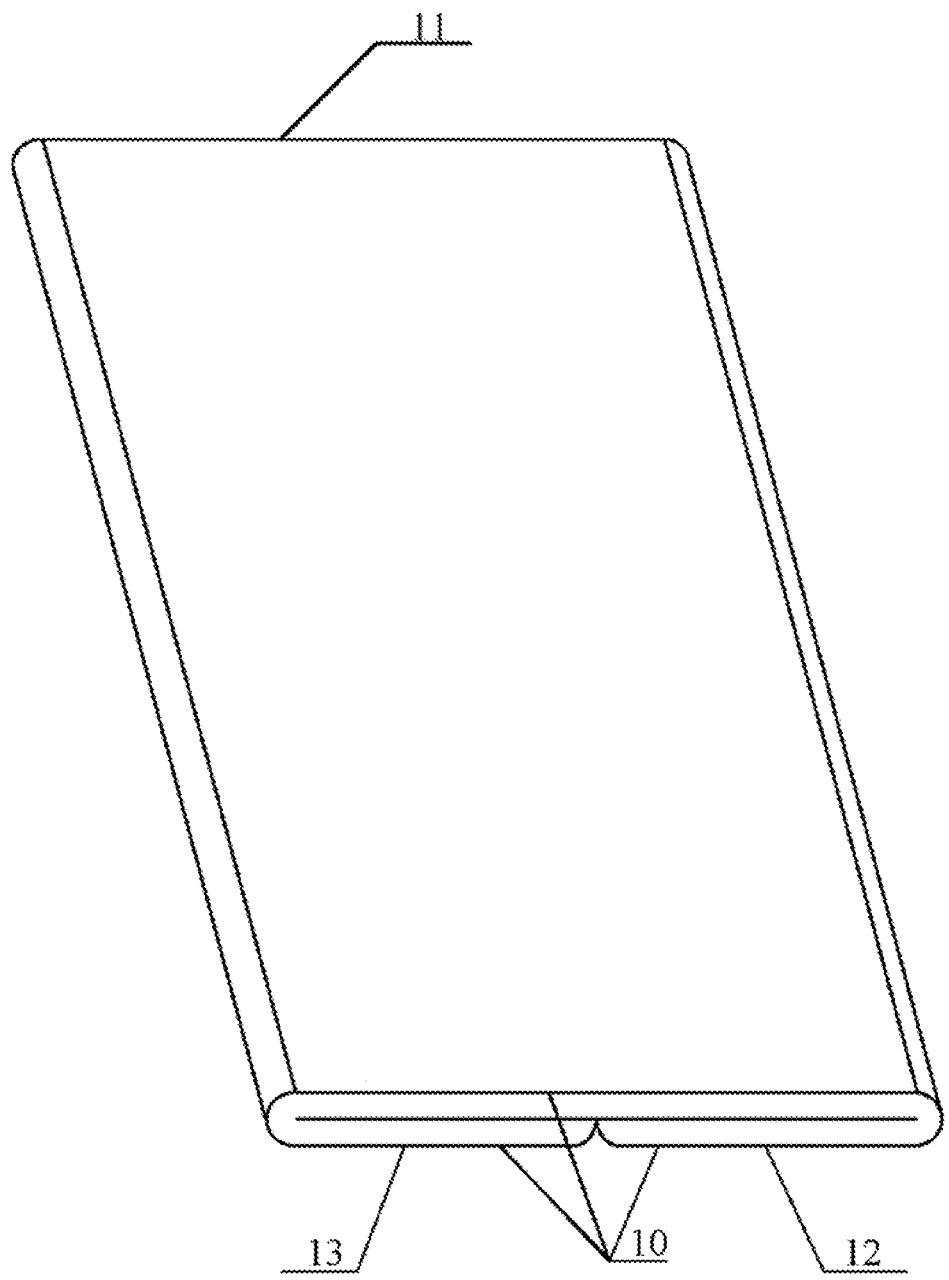
FIG. 6 shows schematic views of a folding display screen according to an exemplary embodiment.
Figure 7:
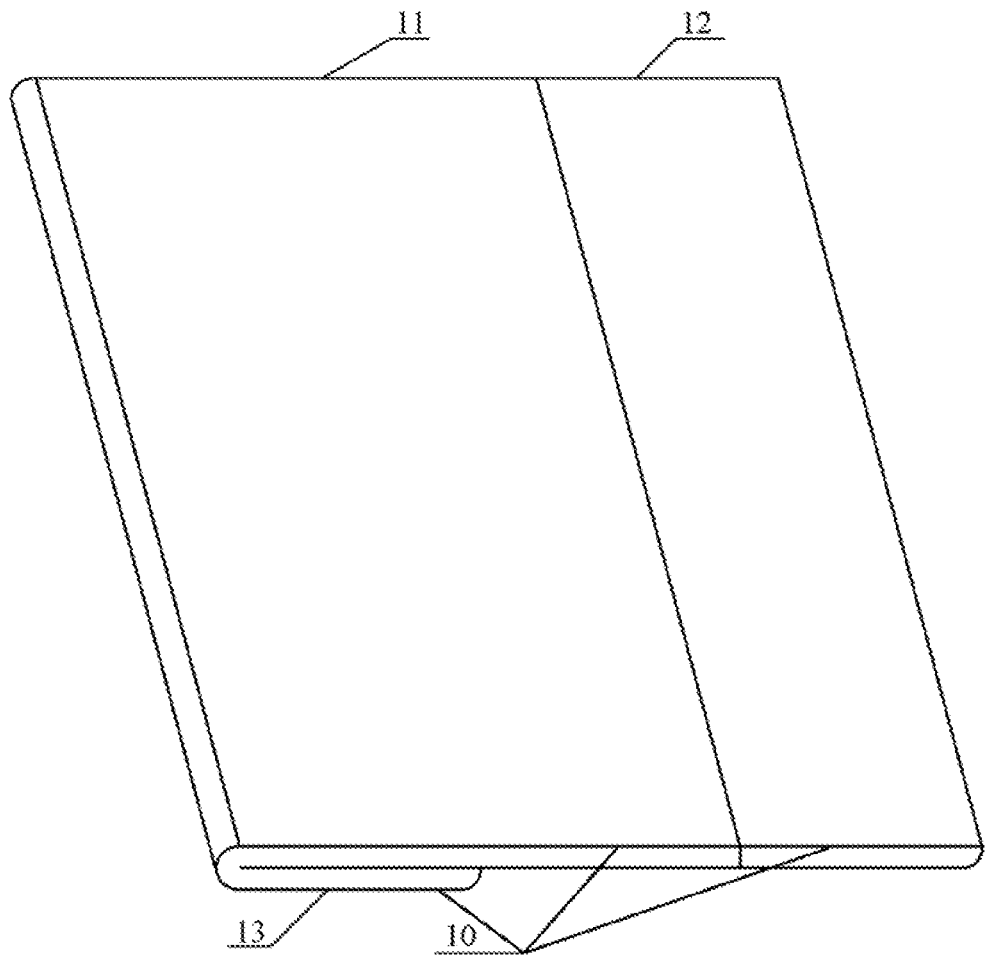
FIG. 7 shows schematic views of a folding display screen according to an exemplary embodiment.

When the folding display screen includes three screens, that is, a home screen, a first auxiliary screen, and a second auxiliary screen, the screen states of the folding display screen include a folded state, an expanded state, and a semi-expanded state. The screen state of the folding display screen may be any one of the folded state, the expanded state, and the semi-expanded state. Illustratively, as shown in FIG. 6, the folded state refers to a state in which the home screen 11, the first auxiliary screen 12, and the second auxiliary screen 13 of the folding display screen 10 are all parallel, and front sides of the first auxiliary screen 12 and the second auxiliary screen 13 are opposite to a front side of the home screen 11. Illustratively, as shown in FIG. 4, the expanded state refers to a state in which the home screen 11, the first auxiliary screen 12, and the second auxiliary screen 13 of the folding display screen 10 are in the same plane, and the front sides of the first auxiliary screen 12 and the second sub-screen 13 are the same as the front side of the home screen 11. Illustratively, as shown in FIG. 7, the semi-expanded state refers to a state between the folded state and the expanded state; that is, one of the two auxiliary screens is in the expanded state, and the other is in the folded state. At this time, the home screen 11 of the folding display screen 10 is in the same plane as one of the auxiliary screens (such as the first auxiliary screen 12 or the second auxiliary screen 13) and the front side of the home screen 11 faces the same direction as the front side of the auxiliary screen, and the front side of the home screen 11 is oriented in the opposite direction to the front side of the other auxiliary screen.

Figure 8:
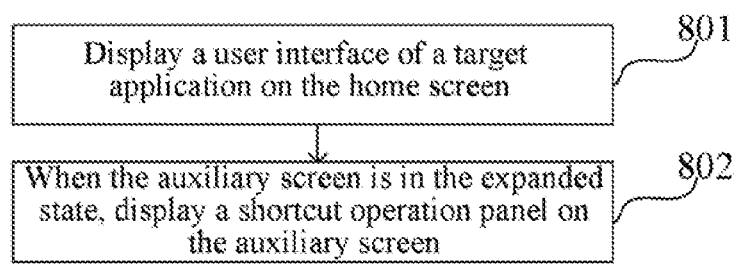
FIG. 8 is a flowchart of a method for displaying a shortcut operation panel according to an exemplary embodiment.

FIG. 8 is a flowchart of a method for displaying a shortcut operation panel according to an exemplary embodiment. The present embodiment is exemplified by applying the method to a terminal having a folding display screen, the folding display screen includes a home screen and n auxiliary screen, and the home screen and the auxiliary screen are collapsible with respect to each other, n being a positive integer. The method may include the following steps (801-802).

In step 801, a user interface of a target application is displayed on the home screen.

The target application may be any one of the applications installed in the terminal. The user interface of the target application refers to a display interface of the target application, and the user interface may include content for the user to view, and may also include an operation control for the user to interact with the computer.

The above target application may be a system application pre-installed before the terminal is shipped from the factory, or a third-party application installed by the user after the terminal is shipped from the factory. The above system application includes, but is not limited to: applications of desktop, photo album, calendar, weather, clock, application management, and the like. The above third-party application includes, but is not limited to: a news reading application, a social-like application, an instant messaging application, a note application, a language translation application, a video-like application, a shopping-like application, etc. The embodiments of the present disclosure do not limit the applications.

When the number n of the auxiliary screen is equal to 1, the screen state of the folding display screen includes a folded state, and an expanded state. The folded state refers to a state in which the home screen and the auxiliary screen are parallel and the front sides of the two screens face in opposite directions. The expanded state refers to a state in which the home screen and the auxiliary screen are expanded to the same plane, and the front sides of the two screens are oriented in the same direction.

When the number n of the auxiliary screen is greater than 1, the screen state of the folding display screen includes a folded state, an expanded state, and a semi-expanded state. The folded state refers to a state in which the home screen is parallel to the n auxiliary screens, and the front sides of the n auxiliary screens face the opposite direction to the front side of the home screen. The expanded state refers to a state in which the home screen and the n auxiliary screens are in the same plane, and the front sides of the n auxiliary screens face the same direction as the front side of the home screen. The semi-expanded state refers to a state in which some of the n auxiliary screen(s) are in the expanded state, and the other auxiliary screen(s) are in the folded state.

In one example, when the folding display screen is in the folded state, the user interface of the target application is displayed on the home screen.

In another example, when the folding display screen is in the semi-expanded state, the user interface of the target application is displayed on the home screen. For example, in other embodiments, when the folding display screen is in the semi-expanded state, the user interface of the target application is displayed on the expanded home screen and auxiliary screen.

In step 802, when the auxiliary screen is in the expanded state, a shortcut operation panel is displayed on the auxiliary screen.

In another example, the auxiliary screen in step 802 may be any one of the n auxiliary screen(s).

In one example, the display of the shortcut operation panel is triggered in such a manner that when the terminal detects the expansion operation corresponding to the auxiliary screen, the shortcut operation panel is displayed on the auxiliary screen. At this time, the terminal has a function of detecting the expansion operation. For example, the terminal may include a Hall sensor through which the user's operation of expanding the auxiliary screen can be detected. When the terminal detects the expansion operation corresponding to any of the auxiliary screens, the terminal is triggered to display the shortcut operation panel on the auxiliary screen, and the user may perform corresponding operations on the shortcut operation panel. In some other embodiments, the display shortcut panel may also be triggered by other means, for example, the display of the shortcut operation panel is triggered by a touch operation, a voice, a gesture, etc.

The shortcut operation panel includes an icon for at least one shortcut operation function associated with the target application. The shortcut operation function is a function for a quick opening. For different applications, the related shortcut operation functions may be different. The above "related" may refer to the function of the target application. For example, if the target application has the function of scanning a graphic code, an icon of the scanning graphic code function may be provided in the shortcut operation panel.

In another example, if the target application is a social-like application, the shortcut operation function related to the target application includes, but is not limited to, at least one of: displaying a social status publishing interface, displaying a graphic code, displaying a graphic code scanning interface, displaying a favorite interface, and displaying a contact list. If the target application is a camera-like application, the shortcut operation function related to the target application includes, but is not limited to, at least one of the following: displaying an album, adjusting a shutter, adjusting a resolution, adjusting an aperture, adjusting a sensitivity, turning on a panoramic shooting, and turning on a filter. If the target application is a video-like application, the shortcut operation function related to the target application includes, but is not limited to, at least one of the following: turning on a screen capture, turning on a brightness adjustment, turning on a volume adjustment, opening a picture-in-picture portal, and displaying a related video recommendation interface. If the target application is a music-like application, the shortcut operation function related to the target application includes, but is not limited to, at least one of the following: turning on a volume adjustment, turning on a scene sound adjustment, and displaying a song listening and identifying interface. If the target application is a shopping-like application, the shortcut operation function related to the target application includes, but is not limited to, at least one of the following: displaying a shopping cart interface, displaying a to-be-received interface, displaying a coupon interface, displaying an order interface, and displaying a favorite interface. The above description of the target application and its associated shortcut operation functions are merely exemplary and explanatory and are not intended to limit the present disclosure.

For example, the at least one shortcut operation function provided by the shortcut operation panel includes: at least one first type of shortcut operation function; and/or at least one-second type of shortcut operation function; and/or at least one-third type of shortcut operation.

The first type of shortcut operation function refers to a preset shortcut operation function provided in the shortcut operation panel, which may be set by the user in advance, or may be set by the terminal and is not limited by the embodiments of the present disclosure. For example, the user may find a corresponding setting option in the system settings provided by the operating system of the terminal, and set in the setting option which shortcut operation function(s) needs to be displayed in the shortcut operation panel. By setting some commonly used shortcut operation functions in the shortcut operation panel, it is more convenient for the user to choose.

The second type of shortcut operation function refers to a shortcut operation function corresponding to an interface opened by the target application in the most recent time period. A certain interface may be reopened and displayed through the shortcut operation function corresponding to the interface. The most recent time period may be a preset duration before the current moment, and the preset duration may be preset, such as 15 minutes, 30 minutes, or 1 hour. By providing the shortcut operation function corresponding to the interface opened in the most recent time period in the shortcut operation panel, the user can conveniently restore the previously displayed user interface.

The third type of shortcut operation function refers to a shortcut operation function recommended by the terminal and related to the user interface currently displayed by the target application. For example, when the target application is a social-like application, and its currently displayed user interface is a chat session interface, the third type of shortcut operation function may include functions of displaying a contact list, displaying a favorite interface, and the like. In a split-screen panel, the shortcut operation function related to the user interface currently displayed by the target application is recommended for the user intelligently, which can better meet the actual needs of the user, provide the user with the required shortcut operation function, and improve the user experience.

The icon of the shortcut operation function is used to identify the shortcut operation function, and different shortcut operation functions have different icons. For example, the icon of the shortcut operation function is an operable control, such as a button, and the user may click on an icon of a certain shortcut operation function to trigger the terminal to perform the shortcut operation function.

In another example, after the foregoing step 802, the method further includes the following steps:

1. receiving a selection signal corresponding to an icon of a target shortcut operation function in the shortcut operation panel; and 2. according to the selection signal, displaying a user interface corresponding to the target shortcut operation function on the auxiliary screen.

The icon of the target shortcut operation function may be an icon of any shortcut operation function in the shortcut panel. The selection signal is triggered by the user and is used to select an operation signal of the shortcut operation function to be executed from the shortcut operation panel. The user may trigger to generate the selection signal of the icon corresponding to the target shortcut operation function by clicking the icon of the target shortcut operation function or long pressing the icon of the target shortcut operation function.

In addition, for different shortcut operation functions, the content contained in the corresponding user interface is also different. For example, when the target shortcut operation function is to display a graphic code, a corresponding graphic code, such as a two-dimensional code or a barcode, may be displayed in the corresponding user interface, and the graphic code may be used for performing a receipt and payment operation or other operation. For another example, when the target shortcut operation function is to display an album, a corresponding album list may be displayed in the corresponding user interface, and the album list includes several photos taken by the user. In the embodiments of the present disclosure, the content included in the user interface corresponding to the target shortcut operation function is not specifically limited.

Figure 9:
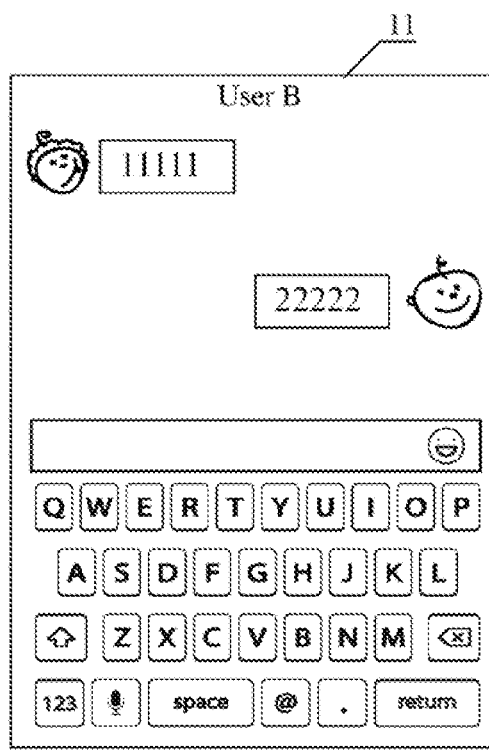
FIG. 9 shows an interface diagram showing a shortcut operation panel according to an exemplary embodiment.
Figure 10:
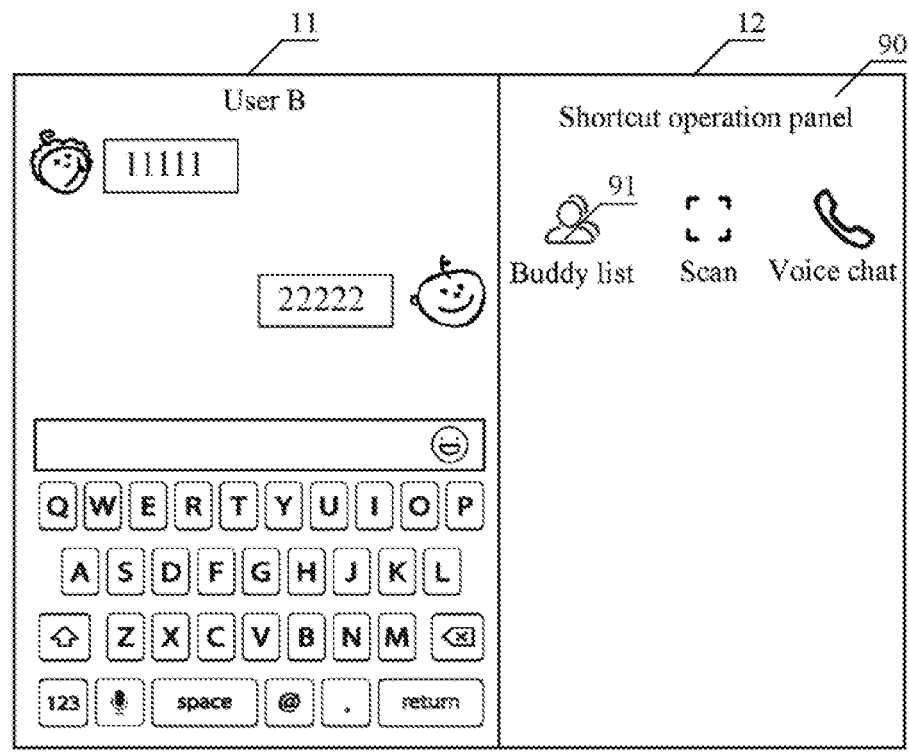
FIG. 10 shows an interface diagram showing a shortcut operation panel according to an exemplary embodiment.

FIG. 9 illustrates a dialog interface of a social-like application is displayed on the home screen 11 when the folding display screen is in the folded state. FIG. 10 illustrates a terminal displaying the shortcut operation panel 90 on the auxiliary screen 12 when the terminal detects the expansion operation corresponding to the auxiliary screen 12.

Figure 11:
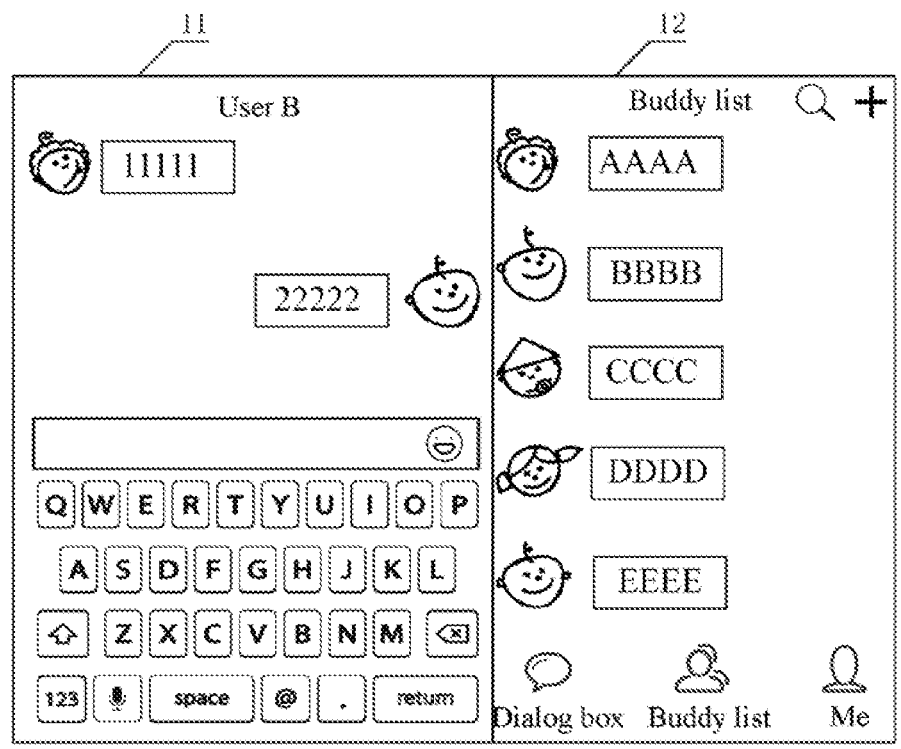
FIG. 11 shows a schematic diagram displaying a user interface corresponding to a shortcut operation function according to an exemplary embodiment.

As shown in FIG. 11, when the user clicks an icon 91 of the shortcut operation function of displaying a buddy list interface in the shortcut operation panel 90 shown in FIG. 10, the buddy list interface is displayed on the auxiliary screen 12.

It should be noted that, in the embodiments of the present disclosure, the user interface corresponding to the target shortcut operation function is displayed on the auxiliary screen as an example. In some other possible embodiments, after the terminal receives the selection signal corresponding to the icon of the target shortcut operation function in the shortcut operation panel, the user interface corresponding to the target shortcut operation function may also be displayed on the home screen, and the shortcut operation panel is kept displayed on the auxiliary screen.

It should also be noted that, in the embodiments of the present disclosure, the following example is used for explanation: when the folding display screen is in the folded state, the auxiliary screen is expanded, and the shortcut operation panel is called in the expanded auxiliary screen. In some other embodiments, when the folding display screen is in the semi-expanded state, it is also supportable to expand the auxiliary screen and call the shortcut operation panel in the expanded auxiliary screen, the process is similar to the above embodiment, and is not elaborated here.

In summary, in the technical solutions provided by the embodiments of the present disclosure, for a terminal having a folding display screen, a display scheme of a shortcut operation panel is provided. When the auxiliary screen is in an expanded state, the user interface of the target application is displayed on the home screen, and the shortcut operation panel is displayed on the auxiliary screen. Since the shortcut operation panel is displayed on the auxiliary screen, the display content on the home screen is not blocked, and it is avoided the impact on the user to view and operate the display content on the home screen.

In addition, by expanding the auxiliary screen, and triggering the display of the shortcut operation panel in the expanded auxiliary screen, it is possible to make full use of the foldable characteristics of the folding display screen, so that the opening process of the shortcut operation panel is relatively simple and efficient.

For example, the user may also add an icon of the shortcut operation function in the shortcut panel, which includes the following two steps: 1. A drag operation signal with a starting position located at a target object in the user interface of the target application and an ending position located in the shortcut operation panel is received. The target object may be a certain content in the user interface of the target application, such as an operation control or an icon, or it may be the user interface itself. The user may trigger the above drag operation signal by a finger or a stylus. 2. According to the drag operation signal, an icon of a shortcut operation function corresponding to the target object is added to the shortcut operation panel. The shortcut operation function corresponding to the target object is used to quickly trigger the user interface displaying the target object. For example, the user clicks on the icon of the shortcut operation function corresponding to the target object, then the display of the user interface of the target object may be triggered.

Figure 12:
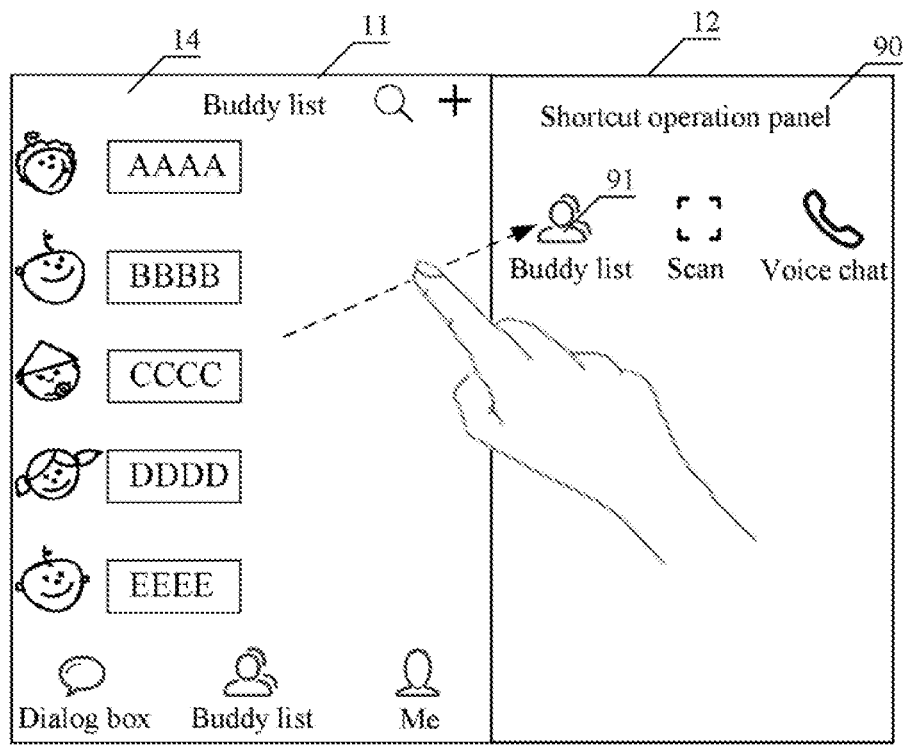
FIG. 12 shows an interface diagram of an icon to which a shortcut operation function is added according to an exemplary embodiment.

Illustratively, as shown in FIG. 12, a buddy list interface 14 of a social-like application is displayed on the home screen 11, and a shortcut operation panel 90 is displayed on the auxiliary screen 12. If the user wants to provide the shortcut operation function of displaying the buddy list interface 14 in the shortcut operation panel 90, the user may perform a drag operation from the buddy list interface 14 to the shortcut operation panel 90; correspondingly, after receiving the above-mentioned drag operation signal, the terminal adds an icon 91 for displaying the shortcut operation function of the buddy list interface 14 in the shortcut operation panel 90.

In summary, in the technical solutions provided by the embodiments of the present disclosure, the user can add the icon of the shortcut operation function to meet different needs of the user, so that the shortcut operation functions provided in the shortcut operation panel are relatively rich; and, the icon of the shortcut operation function may be added in the shortcut operation panel by only dragging, which is easy and convenient to operate.

Figure 13:
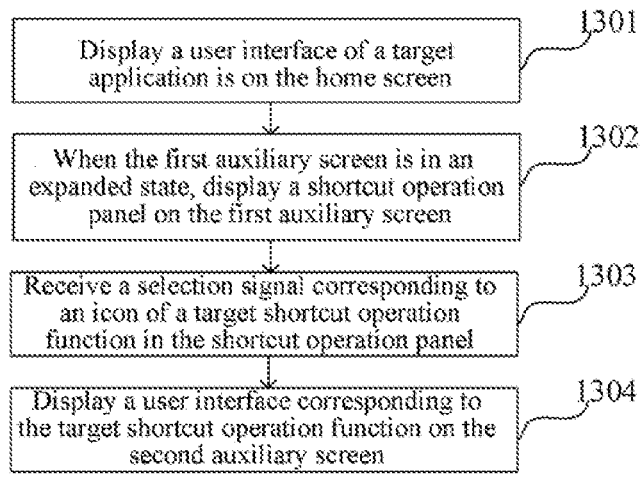
FIG. 13 is a flowchart of a method for displaying a shortcut operation panel according to another exemplary embodiment.

FIG. 13 is a flowchart of a method for displaying a shortcut operation panel according to another exemplary embodiment. In this embodiment, the method is mainly applied to a terminal having a folding display screen. The folding display screen includes a home screen and two auxiliary screens, the two auxiliary screens are respectively a first auxiliary screen and a second auxiliary screen, the home screen is connected to the first auxiliary screen and the second auxiliary screen respectively, and the home screen and the auxiliary screens are foldable with respect to each other. The method may include the following steps (1301~1304).

In step 1301, a user interface of a target application is displayed on the home screen.

In step 1302, when the first auxiliary screen is in an expanded state, a shortcut operation panel is displayed on the first auxiliary screen.

In the embodiments of the present disclosure, the terminal is provided with a function of detecting an expanding operation corresponding to each of the auxiliary screens.

The above steps 1301 to 1302 are the same as or similar to the steps 801 to 802 in FIG. 8 described in the foregoing embodiment of the present disclosure, and the description in the embodiment of FIG. 8 may be referred to, which are not described herein again.

In step 1303, a selection signal corresponding to an icon of a target shortcut operation function in the shortcut operation panel is received.

In step 1304, a user interface corresponding to the target shortcut operation function is displayed on the second auxiliary screen.

Figure 14:
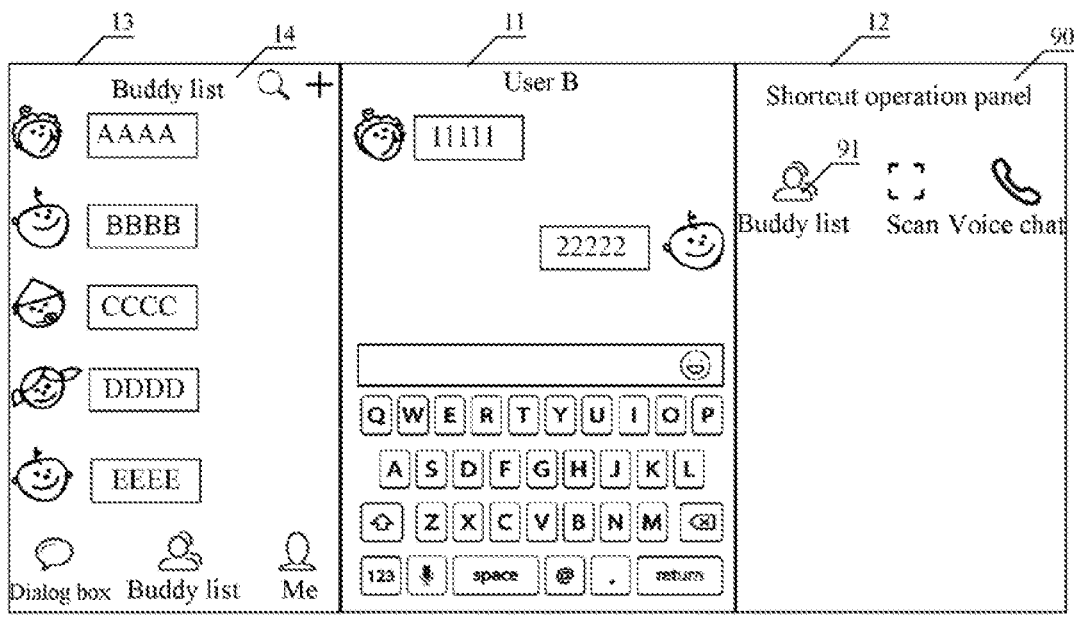
FIG. 14 shows a schematic diagram displaying a shortcut operation panel and a user interface corresponding to the display shortcut operation function according to an exemplary embodiment.

Illustratively, as shown in FIG. 14, a dialog interface of a social-like application is displayed on the home screen 11, and a shortcut operation panel 90 is displayed on the first auxiliary screen 12. When the terminal receives the selection signal corresponding to the icon 91 for displaying the shortcut operation function of the buddy list interface 14 in the shortcut operation panel 90, the buddy list interface 14 is displayed on the second auxiliary screen 13.

For example, if the terminal detects an expansion operation corresponding to the second auxiliary screen after displaying the shortcut operation panel on the first auxiliary screen, the shortcut operation panel is cancelled to be displayed on the first auxiliary screen, and the user interface of the target application is displayed in a full-screen mode in the folding display screen.

When the terminal detects the expansion operation corresponding to the second auxiliary screen, the terminal considers that the user needs a larger display screen to display the user interface of the target application currently displayed on the home screen, at this time, the shortcut operation panel is no longer displayed on the first auxiliary screen. At the same time, the terminal displays the user interface of the target application in a full-screen mode in the folding display screen.

In summary, in the technical solutions provided by the embodiments of the present disclosure, when the folding display screen includes one home screen and two auxiliary screens, the terminal may display the shortcut operation panel in one auxiliary screen and display the user interface corresponding to the shortcut operation function selected by the user in another auxiliary screen, in this way, individual screens of the folding display screen are fully and reasonably applied.

In addition, when the terminal detects the expansion operation corresponding to the second auxiliary screen, the terminal may display the user interface of the application in a full-screen manner in the folding display screen according to the user's requirement of large-screen display, thereby improving the display flexibility of the folding display screen.

The following is an apparatus embodiment of the present disclosure, which may be used to implement the method embodiments of the present disclosure. For details not disclosed in the apparatus embodiments in the present disclosure, the method embodiments of the present disclosure may be referred to.

Figure 15:
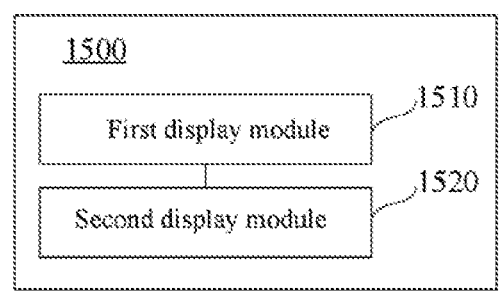
FIG. 15 is a block diagram of an apparatus for displaying a shortcut operation panel according to an exemplary embodiment.

FIG. 15 is a block diagram of an apparatus for displaying a shortcut operation panel according to an exemplary embodiment, the apparatus is applied to a terminal having a folding display screen including a home screen and n auxiliary screen(s), and the home screen and the auxiliary screen are foldable with respect to each other, n being a positive integer. The apparatus has the functions of implementing the foregoing method embodiments, and the functions may be implemented by hardware or may be implemented by software performed by hardware. The apparatus 1500 may include a first display module 1510 and a second display module 1520.

The first display module 1510 is configured to display a user interface of a target application on the home screen.

The second display module 1520 is configured to display a shortcut operation panel on the auxiliary screen when the auxiliary screen is in an expanded state, where the shortcut operation panel includes an icon of at least one shortcut operation function related to the target application.

In summary, in the technical solutions provided by the embodiments of the present disclosure, for a terminal having a folding display screen, a display scheme of a shortcut operation panel is provided. When the auxiliary screen is in an expanded state, the user interface of the target application is displayed on the home screen, and the shortcut operation panel is displayed on the auxiliary screen. Since the shortcut operation panel is displayed on the auxiliary screen, the display content on the home screen is not blocked, and it is avoided an impact on the user for viewing and operating the display content on the home screen.

For example, at least one shortcut operation function provided by the shortcut operation panel includes: at least one first type of shortcut operation function, the first type of shortcut operation function referring to a shortcut operation function provided in the shortcut operation panel in advance; and/or, at least one-second type of shortcut operation function, the second type of shortcut operation function referring to a shortcut operation function corresponding to the interface opened by the target application in the most recent time period; and/or, at least one-third type of shortcut operation function, the third type of shortcut operation function referring to a shortcut operation function recommended by the terminal and related to the target application.

Figure 16:
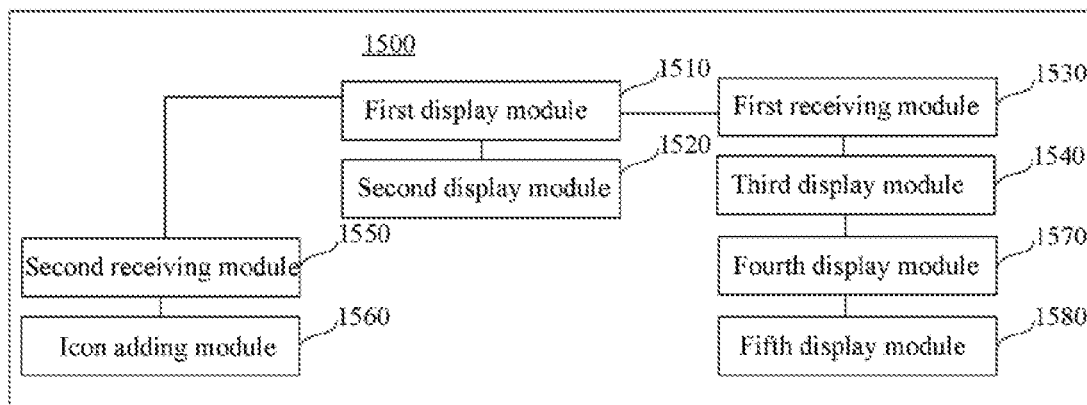
FIG. 16 is a block diagram of an apparatus for displaying a shortcut operation panel according to an exemplary embodiment.

For example, as shown in FIG. 16, the apparatus 1500 further includes a first receiving module 1530 and a third display module 1540.

The first receiving module 1530 is configured to receive a selection signal corresponding to an icon of a target shortcut operation function in the shortcut operation panel on the auxiliary screen.

The third display module 1540 is configured to display a user interface corresponding to the target shortcut operation function on the home screen or the auxiliary screen according to the selection signal.

For example, if the target application is a social-like application, the shortcut operation function related to the target application includes at least one of displaying a social status publishing interface, displaying a graphic code, displaying a graphic code scanning interface, displaying a favorite interface and displaying a contact list;

if the target application is a camera-like application, the shortcut operation function related to the target application includes at least one of the following: displaying an album, adjusting a shutter, adjusting a resolution, adjusting an aperture, adjusting a sensitivity, turning on a panoramic shooting, and turning on a filter;

if the target application is a video-like application, the shortcut operation function related to the target application includes at least one of the following: turning on a screen capture, turning on a brightness adjustment, turning on a volume adjustment, opening a picture-in-picture portal, and displaying a related video recommendation interface;

if the target application is a music-like application, the shortcut operation function related to the target application includes at least one of the following: turning on a volume adjustment, turning on a scene sound adjustment, and displaying a song listening and identifying interface;

if the target application is a shopping-like application, the shortcut operation function related to the target application includes at least one of the following: displaying a shopping cart interface, displaying a to-be-received interface, displaying a coupon interface, displaying an order interface, and displaying a favorite interface.

For example, the apparatus 1500 further includes: a second receiving module 1550 and an icon adding module 1560.

The second receiving module 1550 is configured to a drag operation signal with a starting position located at an icon of the target shortcut operation function in the user interface of the target application and an ending position located in the shortcut operation panel.

The icon adding module 1560 is configured to add an icon of a target shortcut operation function to the shortcut operation panel according to the drag operation signal.

For example, the number of the auxiliary screens is two, which are respectively a first auxiliary screen and a second auxiliary screen, and the home screen is connected to the first auxiliary screen and the second auxiliary screen, respectively.

For example, the apparatus 1500 further includes: a fourth display module 1570.

The fourth display module 1570 is configured to, when a selection signal corresponding to an icon of the target shortcut operation function in the shortcut operation panel is received after the shortcut operation panel is displayed on the first auxiliary screen, display a user interface corresponding to the target shortcut operation function on the second auxiliary screen.

For example, the apparatus 1500 further includes: a fifth display module 1580.

The fifth display module 1580 is configured to, when an expansion operation corresponding to the second auxiliary screen is detected after the shortcut operation panel is displayed on the first auxiliary screen, cancel to display the shortcut operation panel, and display the user interface of the target application in a full screen mode in the folding display screen.

It should be noted that, when the apparatus provided by the foregoing embodiments implements its function, only the division of individual functional modules described above is illustrated. In actual applications, the above functions may be distributed to be completed by different functional modules according to actual needs. That is, the content structure of the device is divided into different functional modules to complete all or part of the functions described above.

With respect to the apparatuses in the above embodiments, the specific manners for performing operations for individual modules therein have been described in detail in the embodiments regarding the methods, which will not be elaborated herein.

An exemplary embodiment of the present disclosure further provides an apparatus for displaying a shortcut operation panel, which is applied to a terminal having a folding display screen, the folding display screen including a home screen and n auxiliary screen(s), the home screen and the auxiliary screen(s) being foldable with respect to each other, and n being a positive integer. The above apparatus may implement the method for displaying the shortcut operation panel provided by the present disclosure. The apparatus includes a processor and a memory for storing executable instructions of the processor. The processor is configured to:

display a user interface of a target application on the home screen; and when the auxiliary screen(s) is in an expanded state, display a shortcut operation panel on the auxiliary screen, the shortcut operation panel including an icon of at least one shortcut operation function related to the target application.

For example, the at least one shortcut operation function provided by the shortcut operation panel includes:

at least one first type of shortcut operation function, the first type of shortcut operation function referring to a shortcut operation function provided in the shortcut operation panel in advance; and/or, at least one-second type of shortcut operation function, the second type of shortcut operation function referring to a shortcut operation function corresponding to an interface opened by the target application in the most recent time period; and/or, at least one-third type of shortcut operation function, the third type of shortcut operation function referring to a shortcut operation function recommended by the terminal and related to the target application.

For example, the processor is further configured to: receive a selection signal corresponding to an icon of a target shortcut operation function in the shortcut operation panel; and display a user interface corresponding to the target shortcut operation function on the auxiliary screen according to the selection signal.

For example, if the target application is a social-like application, the shortcut operation function related to the target application includes at least one of: displaying a social status publishing interface, displaying a graphic code, displaying a graphic code scanning interface, displaying a favorite interface and displaying a contact list.

If the target application is a camera-like application, the shortcut operation function related to the target application includes at least one of the following: displaying an album, adjusting a shutter, adjusting a resolution, adjusting an aperture, adjusting a sensitivity, turning on a panoramic shooting, and turning on a filter.

If the target application is a video-like application, the shortcut operation function related to the target application includes at least one of the following: turning on a screen capture, turning on a brightness adjustment, turning on a volume adjustment, opening a picture-in-picture portal, and displaying a related video recommendation interface.

If the target application is a music-like application, the shortcut operation function related to the target application includes at least one of the following: turning on a volume adjustment, turning on a scene sound adjustment, and displaying a song listening and identifying interface.

If the target application is a shopping-like application, the shortcut operation function related to the target application includes at least one of the following: displaying a shopping cart interface, displaying a to-be-received interface, displaying a coupon interface, displaying an order interface, and displaying a favorite interface.

For example, the processor is further configured to: receive a drag operation signal with a start position located at the target object in the user interface of the target application and an ending position located in the shortcut operation panel; and add an icon of a shortcut operation function corresponding to the target object into the shortcut operation panel according to the drag operation signal.

For example, the number of the auxiliary screens is two, which are respectively a first auxiliary screen and a second auxiliary screen, and the home screen is connected to the first auxiliary screen and the second auxiliary screen respectively.

For example, the processor is further configured to: when receiving the selection signal corresponding to the icon of the target shortcut operation function in the shortcut operation panel after the shortcut operation panel is displayed on the first auxiliary screen, display a user interface corresponding to the target shortcut function on the second auxiliary screen.

For example, the processor is further configured to: when an expansion operation corresponding to the second auxiliary screen is detected after the shortcut operation panel is displayed on the first auxiliary screen, cancel to display the shortcut operation panel on the first auxiliary screen, and display the user interface of the target application in a full screen mode in the folding display screen.

Figure 17:
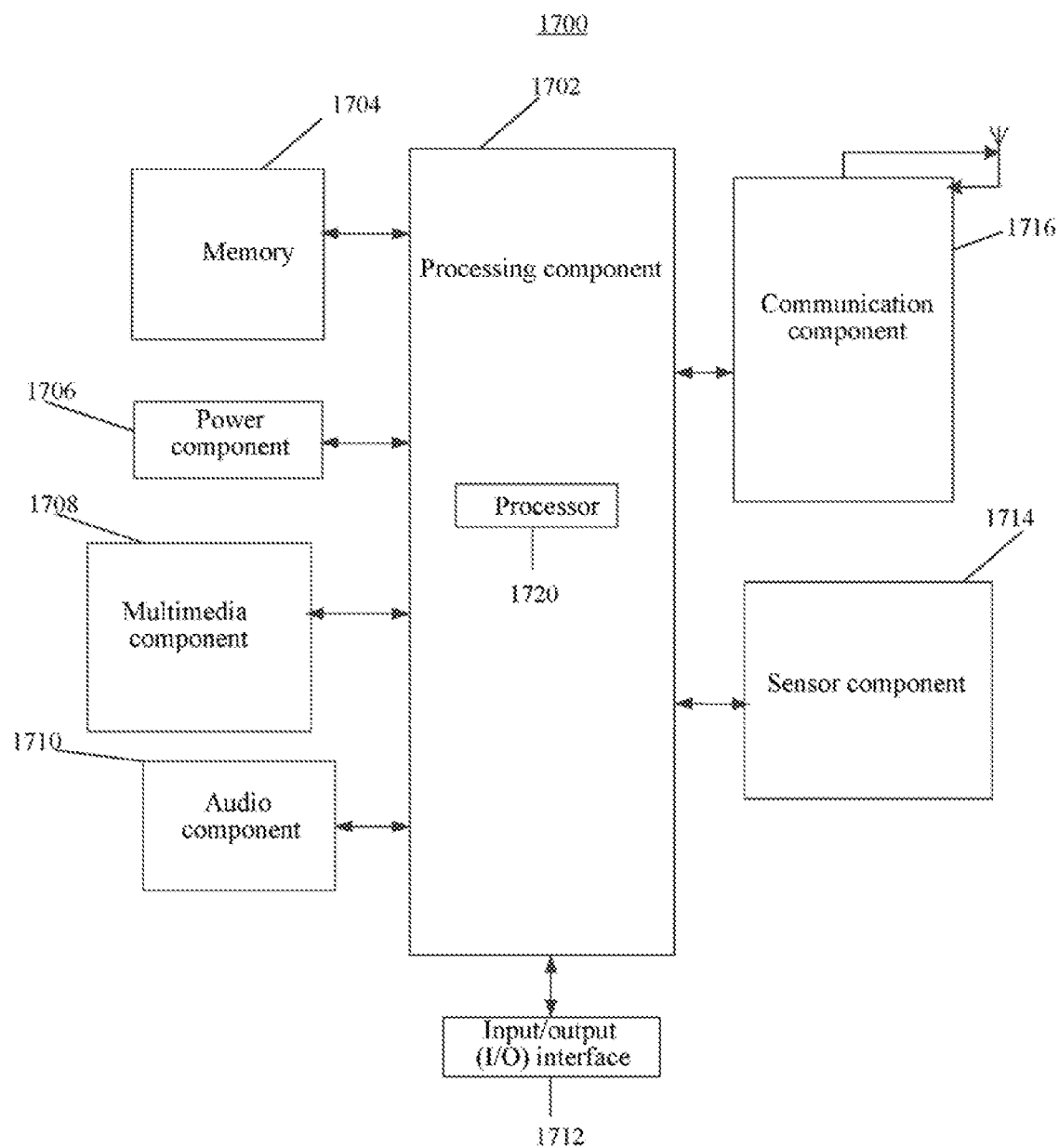
FIG. 17 is a block diagram of an apparatus for displaying a shortcut operation panel according to an exemplary embodiment.

FIG. 17 is a block diagram of an apparatus 1700 for displaying a shortcut operation panel according to an exemplary embodiment of the present disclosure. For example, the apparatus 1700 is a terminal having a folding display screen; the folding display screen includes a home screen and n auxiliary screen(s), the home screen and the auxiliary screen(s) are foldable with respect to each other, and n is a positive integer. For example, the apparatus 1700 may be a mobile phone, a computer, a digital broadcast terminal, a messaging device, a gaming console, a tablet, a medical device, exercise equipment, a personal digital assistant, and the like.

Referring to FIG. 17, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the apparatus 1700, such as the operations associated with a display, telephone calls, data communications, camera operations, and recording operations. The processing component 1702 may include one or more processors 1720 to execute instructions to perform all or part of the steps in the above-described methods. Moreover, the processing component 1702 may include one or more modules that facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any applications or methods operated on the apparatus 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the apparatus 1700. The power component 1706 may include a power management system, one or more power sources, and any other components associated with the generation, management, and distribution of power in the apparatus 1700.

The multimedia component 1708 includes a screen providing an output interface between the apparatus 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action but also sense a period of time and a pressure associated with the touch or swipe action. In some embodiments, the multimedia component 1708 includes a front camera and/or a rear camera. The front camera and the rear camera may receive an external multimedia datum while the apparatus 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the apparatus 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1702 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the apparatus 1700. For instance, the sensor component 1714 may detect an open/closed status of the apparatus 1700, relative positioning of components, e.g., the display and the keypad, of the apparatus 1700, a change in position of the apparatus 1700 or a component of the apparatus 1700, a presence or absence of user contact with the apparatus 1700, an orientation or an acceleration/deceleration of the apparatus 1700, and a change in temperature of the apparatus 1700. The sensor component 1714 may include a proximity sensor configured to detect the presence of nearby objects without any physical contact. The sensor component 1714 may also include a photosensitive sensor, such as a CMOS or CCD image sensor, for use in imaging applications. In some embodiments, the sensor component 1714 may also include an accelerometer sensor, a gyroscope sensor, a magnetic sensor, a pressure sensor, a temperature sensor, a photoelectric sensor or a GPS sensor.

The communication component 1716 is configured to facilitate communication, wired or wirelessly, between the apparatus 1700 and other devices. The apparatus 1700 may access a wireless network based on a communication standard, such as WiFi, 2G, 3G, 4G, 5G, or subsequent evolution system, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications.

In exemplary embodiments, the apparatus 1700 may be implemented with one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components, for performing the above described methods.

In exemplary embodiments, there is also provided a non-transitory computer-readable storage medium storing thereon computer program, the computer program may be executable by the processor 1720 of the apparatus 1720, for performing the above-described methods for displaying a shortcut operation panel.

For example, the non-transitory computer-readable storage medium may be a ROM, a random access memory (RAM), a CD-ROM, a magnetic tape, a floppy disc, an optical data storage device, and the like.

It shall be understood that the term "plurality" mentioned herein is defined as two or more than two. The term "and/or" describes an association relationship of associated objects, and represents that there may be three relationships. For example, A and/or B may represent three situations including the single existence of A, the simultaneous existence of A and B, and the single existence of B. The symbol "/" generally represents that contextual objects are in an "or" relationship.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within the known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings and that various modifications and changes can be made without departing from the scope thereof. It is intended that the scope of the disclosure only be limited by the appended claims.

What is claimed is:

1. A method for displaying a shortcut operation panel, comprising:
   displaying, by a terminal having a folding display screen, a user interface of a target application on a home screen, wherein the home screen is part of the folding display screen; and
   when an auxiliary screen is in an expanded state, displaying a shortcut operation panel on the auxiliary screen, wherein the auxiliary screen is part of the folding display screen, wherein the shortcut operation panel comprises an icon of at least one shortcut operation function related to the target application, and the icon of the at least one shortcut operation function related to the target application displayed on the home screen is added to the shortcut panel on the auxiliary screen,
   wherein the folding display screen comprises two auxiliary screens in addition to the home screen, a first auxiliary screen and a second auxiliary screen, and the home screen is connected to the first auxiliary screen and the second auxiliary screen respectively, and when a selection signal corresponding to an icon of a target shortcut operation function in the shortcut operation panel is received after the shortcut operation panel is displayed on the first auxiliary screen, a user interface corresponding to the target shortcut operation function is displayed in the second auxiliary screen.

2. The method according to claim 1, wherein the at least one shortcut operation function provided by the shortcut operation panel comprises at least one of following shortcut operation functions:
   a first type of shortcut operation function that refers to a preset shortcut operation function provided in the shortcut operation panel;
   a second type of shortcut operation function that refers to a shortcut operation function corresponding to an interface opened by the target application in a recent time period; and
   a third type of shortcut operation function that refers to a shortcut operation function recommended by the terminal and related to the user interface currently displayed by the target application.

3. The method according to claim 1, further comprising:
   receiving a selection signal corresponding to an icon of a target shortcut operation function in the shortcut operation panel; and
   displaying a user interface corresponding to the target shortcut operation function on the auxiliary screen according to the selection signal.

4. The method according to claim 1, wherein:
   when the target application is a social-like application, the shortcut operation function related to the target application comprises at least one of: displaying a social status publishing interface, displaying a graphic code, displaying a graphic code scanning interface, displaying a favorite interface, and displaying a list of contacts;
   when the target application is a camera-like application, the shortcut operation function related to the target application comprises at least one of: displaying an album, adjusting a shutter, adjusting a resolution, adjusting an aperture, adjusting a sensitivity, turning on a panoramic shooting, and turning on a filter;
   when the target application is a video-like application, the shortcut operation function related to the target application comprises at least one of: turning on a screen capture, turning on a brightness adjustment, turning on a volume adjustment, opening a picture-in-picture portal, and displaying a related video recommending interface;
   when the target application is a music-like application, the shortcut operation function related to the target application comprises at least one of: turning on the volume adjustment, turning on a scene sound adjustment, and displaying a song listening and identifying interface; and
   when the target application is a shopping-like application, the shortcut operation function related to the target application comprises at least one of: displaying a shopping cart interface, displaying a to-be-received interface, displaying a coupon interface, displaying an order interface, and displaying a favorite interface.

5. The method according to claim 1, further comprising:
   receiving a drag operation signal with a starting position located at a target object in the user interface of the target application and an ending position located in the shortcut operation panel; and
   adding an icon of a shortcut operation function corresponding to the target object to the shortcut operation panel according to the drag operation signal.

6. The method according to claim 1, further comprising:
   when an expansion operation corresponding to the second auxiliary screen is detected after the shortcut operation panel is displayed on the first auxiliary screen,
   cancelling the displaying of the shortcut operation panel on the first auxiliary screen, and displaying the user interface of the target application in full screen mode on the folding display screen.

7. An apparatus for displaying a shortcut operation panel comprising:
   a processor; and
   a memory configured to store instructions executable by the processor;
   wherein the processor is configured to:
   display, by a terminal having a folding display screen, a user interface of a target application on a home screen, wherein the home screen is part of the folding display screen; and
   when an auxiliary screen is in an expanded state, display a shortcut operation panel on the auxiliary screen, wherein the auxiliary screen is part of the folding display screen,
   wherein the shortcut operation panel comprises an icon of at least one shortcut operation function related to the target application, and the icon of the at least one shortcut operation function related to the target application displayed on the home screen is added to the shortcut panel on the auxiliary screen,
   wherein the folding display screen comprises two auxiliary screens in addition to the home screen, a first auxiliary screen and a second auxiliary screen, and the home screen is connected to the first auxiliary screen and the second auxiliary screen respectively, and when a selection signal corresponding to an icon of a target shortcut operation function in the shortcut operation panel is received after the shortcut operation panel is displayed on the first auxiliary screen, a user interface corresponding to the target shortcut operation function is displayed in the second auxiliary screen.

8. The apparatus according to claim 7, wherein the at least one shortcut operation function provided by the shortcut operation panel comprises at least one of following shortcut operation functions:
   a first type of shortcut operation function referring to a preset shortcut operation function provided in the shortcut operation panel;
   a second type of shortcut operation function referring to a shortcut operation function corresponding to an interface opened by the target application in a recent time period;
   a third type of shortcut operation function referring to a shortcut operation function recommended by the terminal and related to the user interface currently displayed by the target application.

9. The apparatus according to claim 7, wherein the processor is further configured to: receive a selection signal corresponding to an icon of a target shortcut operation function in the shortcut operation panel; and
   display a user interface corresponding to the target shortcut operation function on the auxiliary screen according to the selection signal.

10. The apparatus according to claim 7, wherein:
    when the target application is a social-like application, the shortcut operation function related to the target application comprises at least one of: displaying a social status publishing interface, displaying a graphic code, displaying a graphic code scanning interface, displaying a favorite interface, and displaying a list of contacts;
    when the target application is a camera-like application, the shortcut operation function related to the target application comprises at least one of: displaying an album, adjusting a shutter, adjusting a resolution, adjusting an aperture, adjusting a sensitivity, turning on a panoramic shooting, and turning on a filter;
    when the target application is a video-like application, the shortcut operation function related to the target application comprises at least one of: turning on a screen capture, turning on a brightness adjustment, turning on a volume adjustment, opening a picture-in-picture portal, and displaying a related video recommending interface;
    when the target application is a music-like application, the shortcut operation function related to the target application comprises at least one of: turning on the volume adjustment, turning on a scene sound adjustment, and displaying a song listening and identifying interface; and
    when the target application is a shopping-like application, the shortcut operation function related to the target application comprises at least one of: displaying a shopping cart interface, displaying a to-be-received interface, displaying a coupon interface, displaying an order interface, and displaying a favorite interface.

11. The apparatus according to claim 7, wherein the processor is further configured to:
    receive a drag operation signal with a starting position located at a target object in the user interface of the target application and an ending position located in the shortcut operation panel; and
    add an icon of a shortcut operation function corresponding to the target object to the shortcut operation panel according to the drag operation signal.

12. The apparatus according to claim 7, wherein the processor is further configured to:
    when an expansion operation corresponding to the second auxiliary screen is detected after the shortcut operation panel is displayed on the first auxiliary screen, cancel the display of the shortcut operation panel on the first auxiliary screen, and display the user interface of the target application in full screen mode on the folding display screen.

13. A non-transitory computer-readable storage medium having stored therein instructions when executed by a processor, cause the processor to perform acts comprising:
    displaying, by a terminal having a folding display screen, a user interface of a target application on a home screen, wherein the home screen is part of the folding display screen; and
    when an auxiliary screen is in an expanded state, displaying a shortcut operation panel on the auxiliary screen, wherein the auxiliary screen is part of the folding display screen, wherein the shortcut operation panel comprises an icon of at least one shortcut operation function related to the target application, and the icon of the at least one shortcut operation function related to the target application displayed on the home screen is added to the shortcut panel on the auxiliary screen,
    wherein the folding display screen comprises two auxiliary screens in addition to the home screen, a first auxiliary screen and a second auxiliary screen, and the home screen is connected to the first auxiliary screen and the second auxiliary screen respectively, and when a selection signal corresponding to an icon of a target shortcut operation function in the shortcut operation panel is received after the shortcut operation panel is displayed on the first auxiliary screen, a user interface corresponding to the target shortcut operation function is displayed in the second auxiliary screen.

14. The non-transitory computer-readable storage medium of claim 13, wherein the acts further comprise:
    when the target application is a social-like application, the shortcut operation function related to the target application comprises at least one of: displaying a social status publishing interface, displaying a graphic code, displaying a graphic code scanning interface, displaying a favorite interface, and displaying a list of contacts.

15. The non-transitory computer-readable storage medium of claim 13, wherein the acts further comprise:
    when the target application is a camera-like application, the shortcut operation function related to the target application comprises at least one of: displaying an album, adjusting a shutter, adjusting a resolution, adjusting an aperture, adjusting a sensitivity, turning on a panoramic shooting, and turning on a filter.

16. The non-transitory computer-readable storage medium of claim 13, wherein the acts further comprise:
    when the target application is a video-like application, the shortcut operation function related to the target application comprises at least one of: turning on a screen capture, turning on a brightness adjustment, turning on a volume adjustment, opening a picture-in-picture portal,
    and displaying a related video recommending interface;
    when the target application is a music-like application, the shortcut operation function related to the target application comprises at least one of: turning on the volume adjustment, turning on a scene sound adjustment, and displaying a song listening and identifying interface; and when the target application is a shopping-like application, the shortcut operation function related to the target application comprises at least one of: displaying a shopping cart interface, displaying a to-be-received interface, displaying a coupon interface, displaying an order interface, and displaying a favorite interface.

* * * * *